Figures 1, 2:
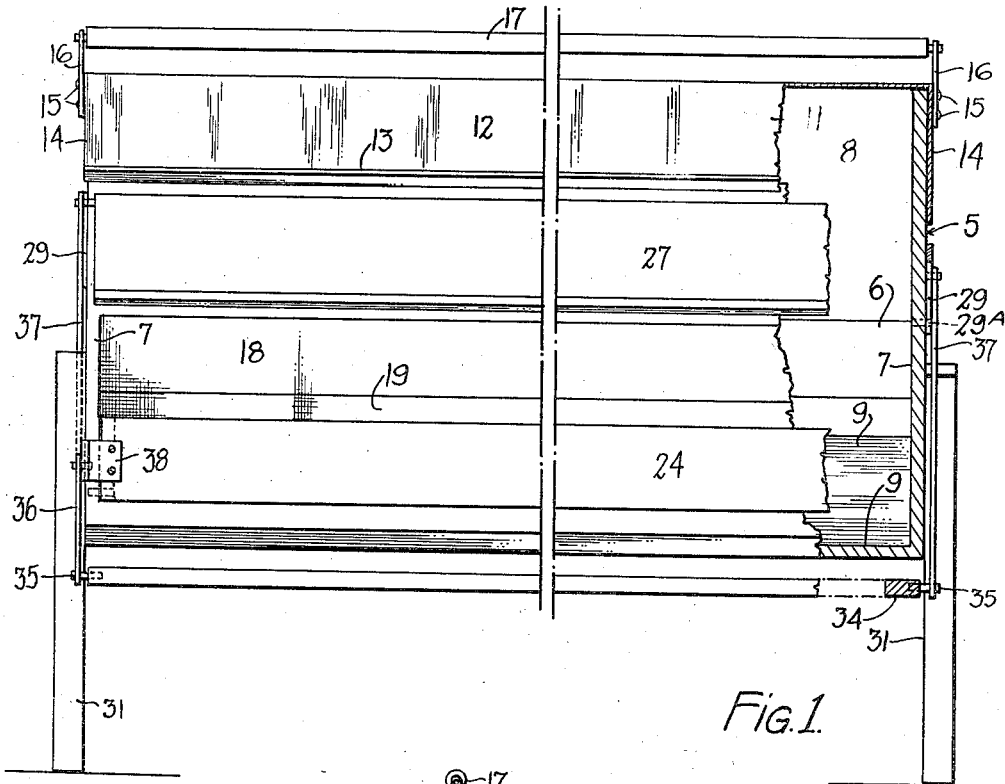

Feb. 15, 1938.     I. C. BUSCH     2,108,102
POULTRY FEEDER
Filed Jan. 25, 1937

INVENTOR.
IRA C. BUSCH.
BY John J. Lynch
ATTORNEY.

Patented Feb. 15, 1938

2,108,102

UNITED STATES PATENT OFFICE 2,108,102

POULTRY FEEDER

Ira C. Busch, Lebanon, N. J.

Application January 25, 1937, Serial No. 122,268

6 Claims. (Cl. 119—55)

This invention relates to poultry feeders and in particular to a type in which the weight of the fowl is employed in making the feed available.

While devices of this general type are not novel, it is an object of my invention to provide a feeder which has advantages not heretofore found in feeders; comprising an upper and a lower door, the latter of which is arranged to move outward when the upper door is raised to give access to the feed, the outward movement making it possible for a fowl to release his head should he be caught between the doors due to his having slipped off the foot board. In doors that close, many fowl are strangled because they accidentally get their necks caught between the closing doors and are unable to release themselves.

Another object of the invention is to provide such lower door with an outward swinging motion so that it acts as a trough or bib during feeding so that the feed is not wasted and the opening in the side of the feeder is increased without moving the doors an unusually necessary amount.

Other objects of my invention are to provide a feeder which can be constructed without catches or locks or an unnecessary number of moving parts so that its operation is easy and the feeder will not require constant repair and adjustment. Further, the feeder is closed when not in use so that rodents, birds and large insects are kept out, and the feed is maintained in a clean, sanitary condition and is prevented from blowing away. Further, the feed is kept dry, and large quantities can be stored in the feeder at a time thus eliminating the necessity of constantly replenishing the feeder with its attendant labor.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention, illustrated in the accompanying drawing, in which Figure 1 is a view in side elevation of a feeder constructed in accordance with my invention, parts thereof being broken away to show the interior construction, and Figure 2 is a view in end elevation of the feeder as illustrated in Figure 1, a part thereof being shown in section and in operating position.

Referring to the drawing in detail, 5 indicates a feeder construction including a body 6 of substantially rectangular shape having end, side and bottom walls 7, 8, and 9 respectively. The top of the feeder 5 is open for receiving a supply of feed 10, but is normally closed by a cover 11 of any suitable material. The sides 12 of the cover are sloped and terminate in edge gutters 13 which drain water or moisture off the feeder so that the interior thereof is kept dry. The ends 14 of the cover fit closely over the upper edges of the end walls 7 of the feeder and have attached thereto as at 15 the posts 16 between which is rotatably mounted a lifting handle 17 or bar. The purpose in making the handle rotatable is to prevent its use by the fowl for a perch.

The side walls of the feeder are projected inwardly as at 18 and downwardly as at 19 to provide a bin that is self-feeding, the portions 19 terminating short of the bottom wall 9 to provide a longitudinal opening 20 through which the feed drops into the troughs 21 formed at opposite side edges of the feeder by the junction of the bottom wall 9 and the lower inturned edge 22 of the side walls 8. At the place where the side walls project inwardly and downwardly as set forth, an opening is provided longitudinally along the opposite sides of the feeder into which the fowl may put their heads to feed. This opening 23 may be partly closed by a hinged lower door 24 or closure strip which swings on its pivot pins 25 as will be later described. The door 24 is provided with end walls 26 which prevent any spilling of the feed out of the feeder. That portion of the opening 23 that is not closed by the lower door 24 is arranged to be closed by an upper slide door 27 which rests against the exterior wall 8 of the feeder and is pivoted as at 28 to one end of a lever 29.

The lower edge of door 27 is provided with a rib or projection 30 so that water is drained off and does not get into the feeder between the doors 27 and 24 when the latter are closed.

An important object of the invention is to provide a feeder which is opened by the fowl and which is safe in operation and will not permit the fowl to become caught between the doors without possibility of self release and in order to provide this feature, I have mounted the feeder 5 on the legs 31 and between the legs have pivoted as at 32, a foot board 33. The foot board 33 is provided with the arms 34 which are pivoted as at 32 to the legs 31. Inasmuch as both sides of the feeder are alike in construction, a description of one side will suffice. Both ends of the feeder construction are alike and in this respect a saving in the cost of manufacture of the feeders is possible.

The arms 34 are connected as at 35 to side links 36 and 37, the links 36 being secured to suitable brackets 38 attached to the outer face of the lower door 24 and the links 37 being attached to the levers 29 which operate the upper door 27. As a chicken or fowl jumps upon the foot board 33, the door 27 is raised through the links 37 and arms or levers 29. Simultaneously, the lower door 24 swings outwardly under the influence of the links 36 as illustrated in Figure 2 and provides an apron or bib which catches the feed that is dropped by the fowl and returns it to the feeder thus preventing waste. The principal function of this lower door however, in addition to completing a closure for the opening 20 is to permit a fowl to release his head in the event it is caught between the doors. This happens frequently when more than one fowl is on the footboard and there is crowding or slipping of some as the rest leave the footboard and it operates. In such case a pull outwardly on the lower door will force the foot board 33 down and raise the top door to release the fowl. A fowl that is caught by the neck, will, due to its weight, cause the lower door to swing open with the result set forth.

The capacity of the feeder is maximum as both sides thereof can be used for feeding and each is operable independently of the other. The bottom wall 9 slopes downwardly and outwardly at opposite sides of the median line of the feeder so that the feed 10 is fed by gravity and thus there is a constant supply of feed in the troughs at opposite sides of the feeder.

In Figure 2, one side of the feeder is illustrated in use, in which case the foot board is horizontal, while at the opposite side the foot board is raised and the doors are closed to provide a solid wall. The feeder when closed or not in use thus presents a sanitary feed storage device which keeps out rodents and birds and prevents wind from blowing the feed out to waste. Also, the feeder may be filled thus providing the fowl with a large supply which eliminates the necessity of constant feeding and also prevents the feed from getting wet and spoiling. The feeder makes feed available at any time to the fowl and is accident proof, simple in construction, can be made at reasonable cost and does not get out of order.

The pivot 28 of the door 27 allows it to be swung out to release a fowl that is caught between the doors. The levers 29 that swing doors 27 are pivoted as at 29A to the end walls 7 of the bin or feeder.

While I have illustrated and described my invention with some degree of particularity, I realize that in practice various alterations therein may be made without departing from the spirit of the invention or the scope of the appended claims.

What I claim is:

1. In a poultry feeder, in combination, a bin having a side opening, an upper and a lower door for closing said opening, a foot-board pivotally associated with the bin and movable downwardly by the weight of a fowl, and connections between the foot-board and the doors whereby downward movement of the foot-board causes an opening movement of said doors.

2. In a poultry feeder, in combination, a bin having a side opening, an upper and a lower door for closing said opening, a foot-board pivotally associated with the bin and movable downwardly by the weight of a fowl, and connections between the footboard and the doors whereby downward movement of the foot-board causes a raising movement of the upper door and an outward swinging movement of the lower door.

3. In a poultry feeder, in combination, a bin having a side opening, an upper and a lower door operable for closing said opening, and a connecting means between the doors, whereby when the doors are closed, an outward pull on the lower door will raise said upper door.

4. In a poultry feeder, in combination, a bin having a side opening, an upper and a lower door operable for closing said opening, a connecting means between the doors whereby when the doors are closed, an outward pull on the lower door will raise said upper door and a footboard operable by the weight of a fowl included in said connecting means.

5. In a poultry feeder, in combination, a bin of substantially rectangular shape, the side walls thereof having openings, movable upper and lower doors cooperable to fill said openings, a footboard extending along each open side of the bin and mounted for vertical pivotal movement, means for connecting the foot-board and each of said doors for operating the latter in unison, a cover detachably positioned on top of the bin and a handle revolvably mounted on the cover.

6. In a poultry feeder, in combination, a bin having a side opening, movable upper and lower doors cooperating to form a closure for said opening, means for pivotally mounting said doors, a foot-board pivotally mounted in association with the bin for vertical movement and means connecting said board and said doors whereby movement of the board will move said doors.

IRA C. BUSCH.